US012650532B2

(12) United States Patent
Guigné et al.

(10) Patent No.: US 12,650,532 B2
(45) Date of Patent: Jun. 9, 2026

(54) SYSTEM AND METHOD FOR DETERMINING WATER BOTTOM SEDIMENT ACOUSTIC PROPERTIES USING A PILE DRIVER ACOUSTIC SOURCE

(71) Applicant: Acoustic Zoom, Inc., Paradise (CA)

(72) Inventors: Jacques Y. Guigné, Paradise (CA); Jonathan B. Machin, Essex (GB)

(73) Assignee: Subsea Micropiles Limited, Dublin (IE)

( * ) Notice: Subject to any disclaimer, the term of this patent is extended or adjusted under 35 U.S.C. 154(b) by 595 days.

(21) Appl. No.: 18/157,758

(22) Filed: Jan. 20, 2023

(65) Prior Publication Data

US 2024/0248229 A1     Jul. 25, 2024

(51) Int. Cl.
G01V 1/143          (2006.01)
G01V 1/22           (2006.01)
(Continued)

(52) U.S. Cl.
CPC .............. G01V 1/345 (2013.01); G01V 1/143 (2013.01); G01V 1/226 (2013.01); G01V 1/303 (2013.01); G01V 1/3852 (2013.01)

(58) Field of Classification Search
CPC ........ G01V 1/345; G01V 1/143; G01V 1/226; G01V 1/303; G01V 1/3808; G01V 1/3852; G01V 1/38; G01V 1/28; G01V 1/364; G01V 1/00; G01V 2210/6163; G01V 2210/55; G01V 2210/1423;
(Continued)

(56) References Cited

U.S. PATENT DOCUMENTS

| | | | | |
|---|---|---|---|---|
| 2022/0179113 | A1* | 6/2022 | Aldawood | ............. G01V 1/303 |
| 2023/0251127 | A1* | 8/2023 | Wilson | .................... G01H 9/004 |
| | | | | 385/12 |
| 2023/0333434 | A1* | 10/2023 | Gupta | ..................... H02J 50/80 |

FOREIGN PATENT DOCUMENTS

| | | | | |
|---|---|---|---|---|
| CA | 3224766 | A1 * | 11/2015 | ............. G01V 1/364 |
| CN | 114624762 | A  * | 6/2022 | ............... G01V 1/24 |

(Continued)

OTHER PUBLICATIONS

P. G. Reinhall and P. H. Dahl, "Acoustic radiation from a submerged pile during pile driving," Oceans 2010 MTS/IEEE Seattle, Seattle, WA, USA, 2010, pp. 1-4 (Year: 2010).*

(Continued)

*Primary Examiner* — Jeffrey P Aiello
(74) *Attorney, Agent, or Firm* — Richard A. Fagin

(57) ABSTRACT

A method for mapping acoustic properties of water bottom sediments includes penetrating a piling into the water bottom sediments at a first of a plurality of locations. A first distributed acoustic sensor is inserted adjacent to the first piling. A second piling is driven into sediments at a second location. Acoustic signals are detected at the first acoustic sensor while penetrating the second piling. The detecting is indexed to a depth of the second piling as it is driven. A second acoustic sensor is inserted adjacent to the second piling. Penetrating a piling, detecting acoustic signals at each acoustic sensor and inserting a sensor are repeated until a piling is driven at all the locations. The signals are used to generate a map of properties of the sediments bounded by the plurality of locations. The properties comprise attenuation excluding effects of diffractors in the sediments.

24 Claims, 8 Drawing Sheets

(51) Int. Cl.
    *G01V 1/30*          (2006.01)
    *G01V 1/34*          (2006.01)
    *G01V 1/38*          (2006.01)
(58) Field of Classification Search
    CPC ... G01V 2210/6222; G01V 2210/1293; G01V
              2210/14; G01N 29/032; G01N 29/024;
              G01F 23/2962; G01F 23/296; G01S 5/18;
                                              G01S 7/521
    USPC ......... 73/861.18, 861.25; 181/112, 110, 108;
              324/334, 323; 367/21, 38, 37, 31;
              382/285; 702/16, 14, 2, 17, 5, 1, 54, 56,
                                              702/48, 25, 116
    See application file for complete search history.

(56)                    References Cited

FOREIGN PATENT DOCUMENTS

| EP | 4099058 | A1 | * | 12/2022 | ............. | G06N 3/045 |
| KR | 20200100268 | A | * | 8/2020 | ............. | E21F 11/00 |
| WO | WO-2017044244 | A1 | * | 3/2017 | .............. | G01V 1/42 |
| WO | 2022046541 | A1 |  | 3/2022 | | |

OTHER PUBLICATIONS

International Search Report dated May 8, 2024, for International
application No. PCT/IB2024/050547.
Written Opinion dated May 8, 2024, for International application
No. PCT/IB2024/050547.

* cited by examiner

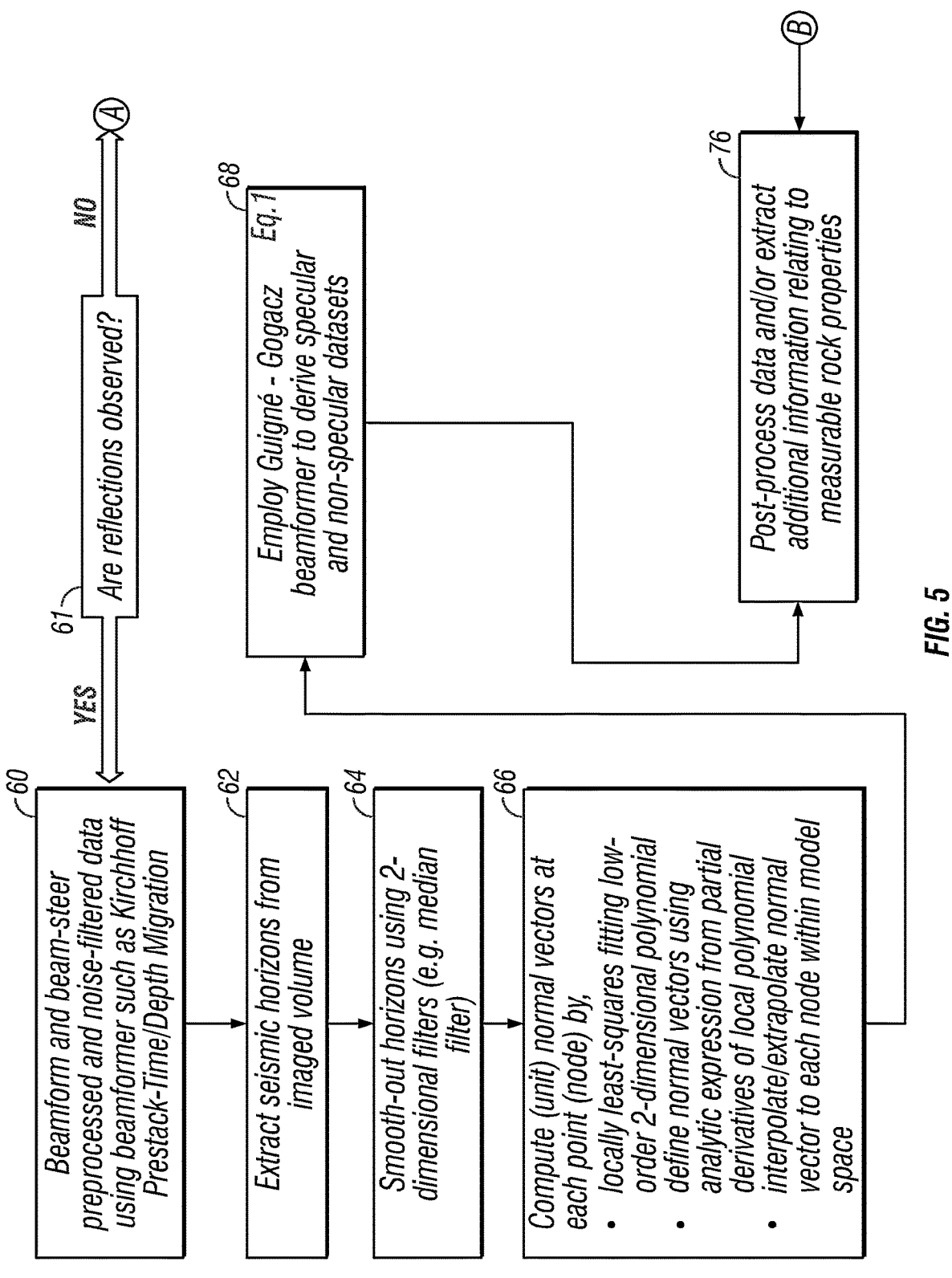

*FIG. 5*

61 — Are reflections observed?

NO → A

YES ↓

60 — Beamform and beam-steer preprocessed and noise-filtered data using beamformer such as Kirchhoff Prestack-Time/Depth Migration 62 — Extract seismic horizons from imaged volume 64 — Smooth-out horizons using 2-dimensional filters (e.g. median filter)

66 — Compute (unit) normal vectors at each point (node) by,
- locally least-squares fitting low-order 2-dimensional polynomial define normal vectors using
- analytic expression from partial derivatives of local polynomial
- interpolate/extrapolate normal vector to each node within model space 68 — Employ Guigné - Gogacz beamformer to derive specular and non-specular datasets   *Eq.1*

76 — Post-process data and/or extract additional information relating to measurable rock properties

B →

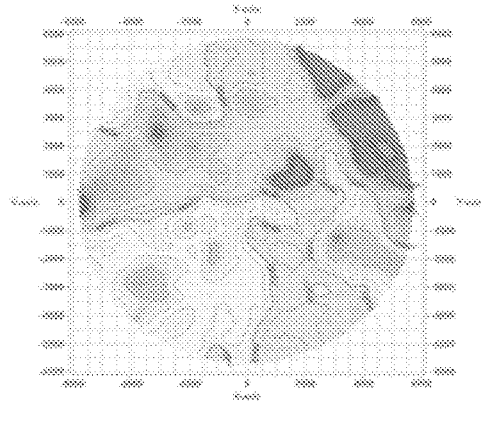
FIG. 6
DISTRIBUTION IMAGE
Dynamic
Shear
Modulus
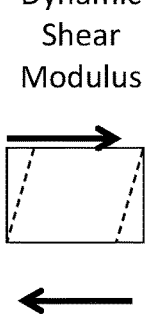
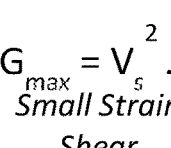
$$G_{max} = V_s^2 \cdot$$
*Small Strain*
*Shear*
Dynamic
Constrained
Modulus
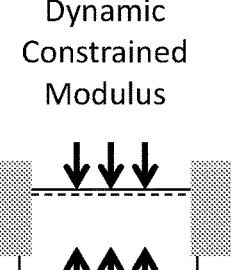
Confined
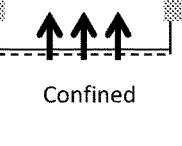
$$D = \frac{}{2}$$
Dynamic
Bulk
Modulus
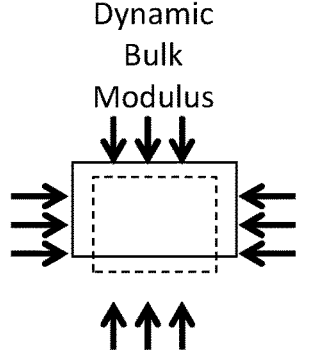
$$B = \rho V_p^2 -$$
Dynamic
Young's
Modulus
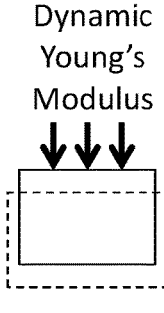
$$E = 2G (1 + \mu)$$
*μ is Poison's Ratio*

1

SYSTEM AND METHOD FOR DETERMINING WATER BOTTOM SEDIMENT ACOUSTIC PROPERTIES USING A PILE DRIVER ACOUSTIC SOURCE

CROSS REFERENCE TO RELATED APPLICATIONS

Not Applicable.

STATEMENT REGARDING FEDERALLY SPONSORED RESEARCH OR DEVELOPMENT

Not Applicable

NAMES OF THE PARTIES TO A JOINT RESEARCH AGREEMENT

Not Applicable.

BACKGROUND

This disclosure relates to the field of acoustic evaluation of water bottom sediment properties. More particularly, the disclosure relates to methods and apparatus for high resolution acoustic evaluation of physical properties and particle fluid structural influences within water bottom sediments and their changes with respect to time.

Current practices for acquiring conventional geotechnical information about sediments on the bottom of a body of water include the in-situ use of a Cone Penetrometer Test (CPT) before sub-bottom drilling or pile driving operations for an offshore foundation installation. The CPT is performed several times to acquire a vertical profile of the water bottom sediment properties. However, there remains a need for spatial remotely acquired geotechnical profiling of the sub-bottom sediments that form the foundational strength of the pile and to then monitor such properties over the life of the foundation structure to determine differences in geotechnical properties that comprise the volume around the foundation.

SUMMARY

One aspect of the present disclosure is a method for mapping acoustic properties of water bottom sediments. A method for mapping acoustic properties of water bottom sediments according to this aspect includes penetrating a first piling into the water bottom sediments at a first location of a plurality of locations associated with a structural foundation. A first distributed acoustic sensor is inserted adjacent to the first driven piling. A second piling is driven into the water bottom sediments at a second location of the plurality of locations. Acoustic signals are detected at the first distributed acoustic sensor while penetrating the second piling. The detecting acoustic signals is indexed to a depth of the second piling as the second piling is driven. A second distributed acoustic sensor is inserted adjacent to the second driven piling. Penetrating a piling, detecting acoustic signals at each of the distributed acoustic sensors and inserting a distributed acoustic sensor are repeated until a piling is driven at all of the plurality of locations. The detected acoustic signals are used to generate a map of acoustic properties of the water bottom sediments in a volume bounded by the plurality of locations. The acoustic properties comprise at least attenuation excluding effects of acoustic diffractors in the water bottom sediments.

2

Some embodiments further comprising deploying a spiral array of acoustic sensors on a water bottom around the first location, and detecting acoustic signals corresponding to impacts of penetrating the first piling at the acoustic sensors on the spiral array, wherein the generating a map comprises determining an acoustic velocity profile proximate the first location from the detected acoustic signals from the spiral array.

In some embodiments, the spiral array comprises sensors spaced apart at equal angles.

In some embodiments, the spiral array comprises sensors spaced apart at equal distances between adjacent sensors.

In some embodiments, each distributed acoustic sensor comprises a plurality if individual optical sensing elements along an optical fiber.

In some embodiments, penetrating the first piling, penetrating the second piling and penetrating any subsequent piling comprises operating a hammer using a swept impact timing sequence.

In some embodiments, the generating a map comprises beam steering a response of individual sensing elements on each distributed acoustic sensor to each of a plurality of points in the volume.

In some embodiments, the excluding effects of diffractors comprises beamforming a response of the distributed acoustic sensors.

Some embodiments further comprise generating a map of at least one of density, porosity and fluid pressure of the water bottom sediments from the map of attenuation.

Methods according to the present disclosure provide novel signal acquisition geometry over the water bottom. Instrumented foundation support piles capture hammer drill/pile seismic transmissions. Accounting of scattering influences quantifies variation in the amplitude of a seismic reflection with the angle of incidence or source-geophone distance at unprecedented accuracy. A correlation to changes in velocity, density, and Poisson's ratio evolves not as a specific point but as a distribution through the spatial imagery within the volume defined by the final installation and placement of the piles.

A computer program according to another aspect of the disclosure is stored in a non-transitory computer readable medium. The computer program comprises logic operable to cause a programmable computer to perform actions on acoustic signals detected by a plurality of sensing elements on each of a plurality of distributed acoustic sensors, wherein each distributed acoustic sensor is placed proximate a piling penetrating into water bottom sediments to support a structure. The acoustic signals are acquired in response to penetrating a subsequent piling into the water bottom sediments. The actions include indexing the detected acoustic signals with respect to depth of the penetrating piling and a time of detection. The indexed, detected acoustic signals are used to generate a map of acoustic properties of the water bottom sediments in a volume bounded by the plurality of driven pilings, the acoustic properties comprising at least attenuation excluding effects of acoustic diffractors in the water bottom sediments.

Some embodiments further comprise logic operable to cause the programmable computer to generate an acoustic velocity profile proximate a position of the penetrating piling from signals detected by a spiral array of acoustic sensors deployed on a water bottom proximate the penetrating piling.

In some embodiments, the spiral array comprises sensors spaced apart at equal angles.

In some embodiments, the spiral array comprises sensors spaced apart at equal distances between adjacent sensors.

In some embodiments, each distributed acoustic sensor comprises a plurality of individual optical sensing elements along an optical fiber.

In some embodiments, penetrating the piling comprises operating a hammer using a swept impact timing sequence.

In some embodiments, the generating a map comprises beam steering a response of individual sensing elements on each distributed acoustic sensor to each of a plurality of points in the volume.

In some embodiments, the excluding effects of diffractors comprises beamforming a response of the distributed acoustic sensors.

Some embodiments further comprise logic operable to cause the programmable computer to generate a map of at least one of density, porosity and fluid pressure of the water bottom sediments from the map of attenuation.

Some embodiments further comprise logic operable to cause the programmable computer to perform using signals measured on the penetrating piling to correct the detected acoustic signals for timing and/or amplitude variation.

In some embodiments, correcting the detected acoustic signals comprises cross-correlating the detected acoustic signals with the measured seismic signals.

Some embodiments further comprise logic operable to cause the programmable computer to generate an image of distribution of small strain at at least one depth in the water bottom sediments.

Other aspects and possible advantages will be apparent from the description and claims that follow.

BRIEF DESCRIPTION OF THE DRAWINGS

FIG. 6 shows an example embodiment of a small strain distribution map that may be generated using a method according to the present disclosure.

DETAILED DESCRIPTION

Figure 1:
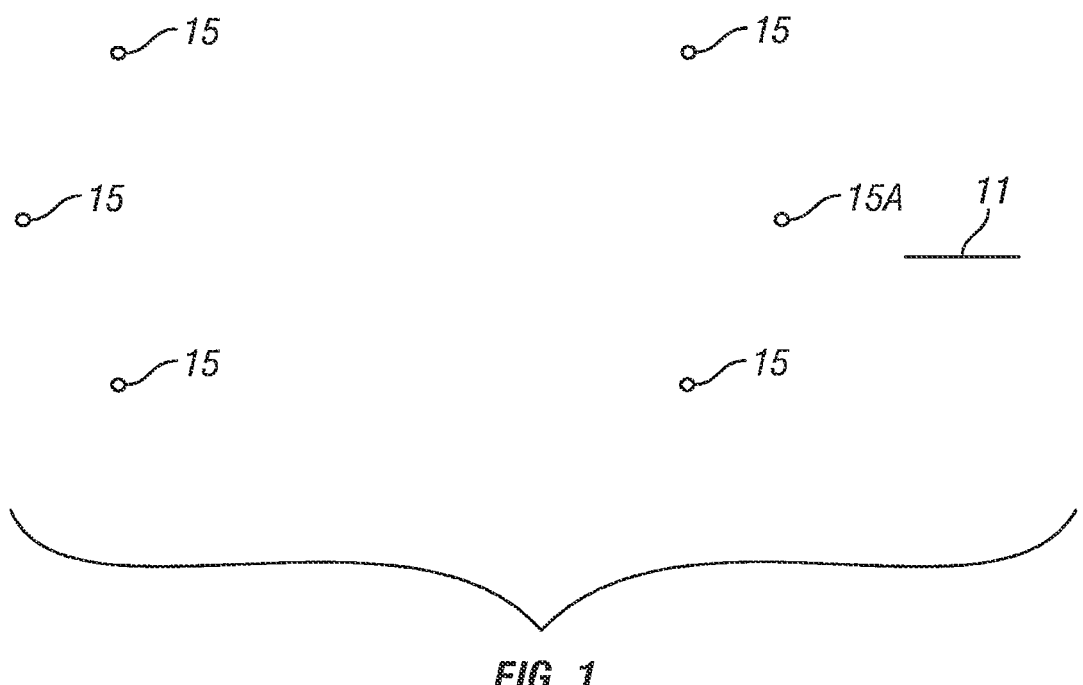
FIG. 1 shows a map of locations for support piles for a bottom supported marine structure.

FIG. 1 shows a plan view of a plurality of locations 15 for pilings or similar support columns (not shown) to be inserted into water bottom sediments 11. The pilings (not shown) may be used to support a marine structure (not shown). A pile driver, to be explained further below with reference to FIG. 4, may be moved to a first one 15A of the plurality of locations 15 in order to drive a piling, i.e., cause the piling, see 30 in FIG. 4, to penetrate, into the water bottom sediments 11 at such first location 15A. In an example embodiment of a method according to the present disclosure, the pile driver (see 40 in FIG. 4) may be used as a seismic energy source. Seismic energy at such first location 15A may be detected by an array of seismic sensors deployed in a selected pattern along the water bottom 11. Examples of selected patterns for such array will be explained with reference to FIGS. 2 and 3.

In a method according to the present disclosure, the pile driver is disposed at the first location 15A, and a pilling penetrates, e.g., is driven, into the water bottom sediments 11. Seismic energy generated by the piling being driven or otherwise caused to penetrate the water bottom sediments is detected by the array of sensors (see FIGS. 2 and 3) deployed about the first location 15A. Detected seismic signals may be used to generate an initial estimate of spatial distribution of sediment structure, mineral content and fluid properties. Such estimation will be further explained below, but may comprise, at least, a profile of seismic or acoustic compressional velocity with respect to depth proximate the first location 15A.

Figure 2:
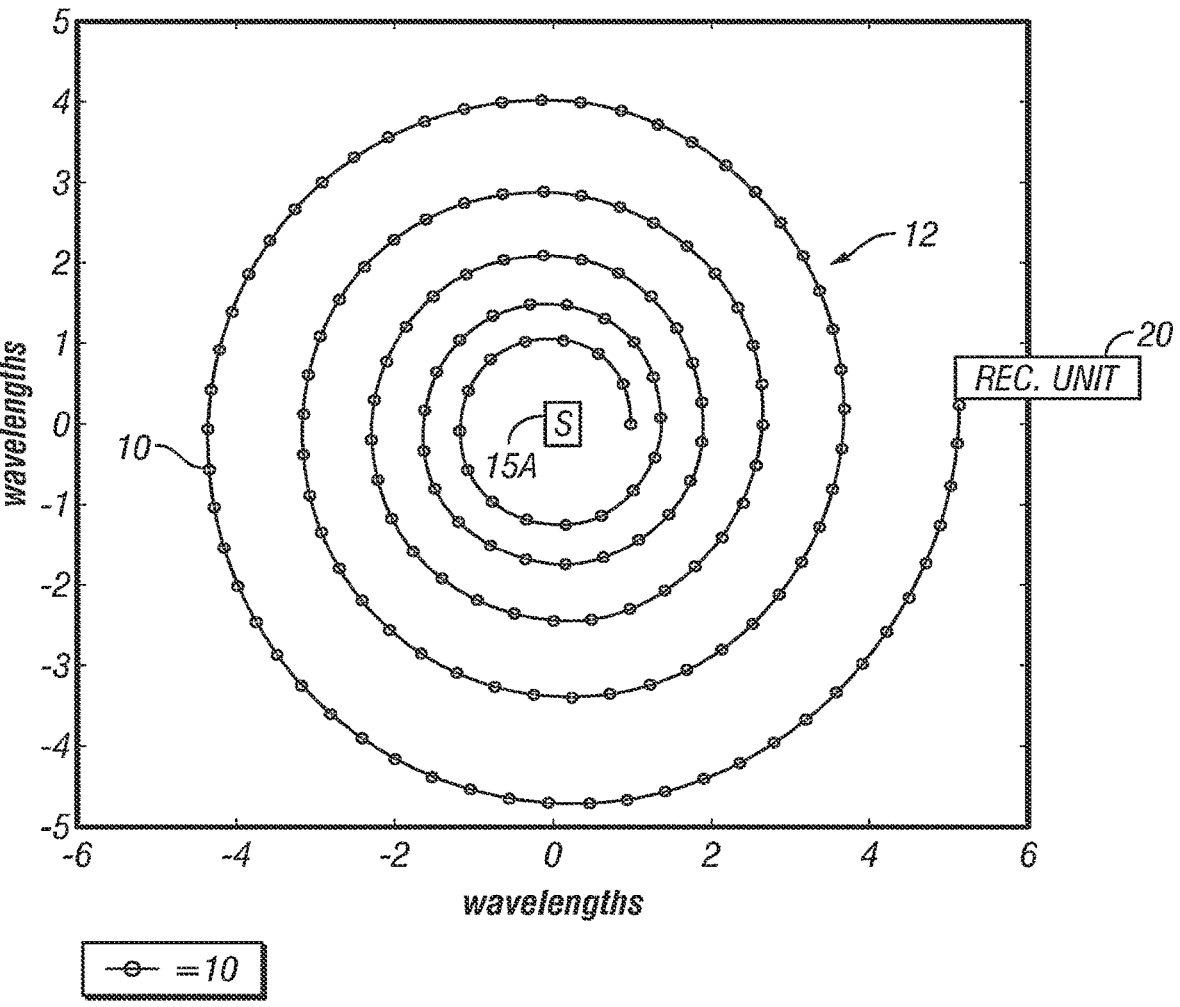
FIG. 2 shows an example embodiment of a spiral sensor array used in an initial part of a method according to the present disclosure.

FIG. 2 shows one example embodiment of a seismic sensor array 12 according to the present disclosure. The array 12 includes a plurality of seismic sensors 10 disposed along a single line (or a plurality of smaller lines connected end to end) of seismic sensors 10. The array 12 is disposed around the first one 15A of the piling locations as explained with reference to FIG. 1.

The seismic sensors 10 each may be single component particle motion responsive sensors, multiple component particle motion sensors (e.g., velocity sensors or accelerometers), pressure or pressure time gradient responsive sensors, or combinations of the foregoing types of sensors. The sensor array 12 may be disposed in the form of a spiral as shown in FIG. 2. The sensors 10 generate electrical and/or optical signals corresponding to seismic or acoustic amplitude at any moment in time. The signals may be conducted to a recording unit 20, which makes a time indexed record of the signals generated by each sensor 10 in the sensor array 12 in response to actuation of a seismic source S. In the present example embodiment, the pile driver (e.g., a hammer drill—40 in FIG. 4) may be used as the seismic source S. In the present example the source S may be located in the geometric center of the array 12. Because the source location is intended to be the first piling location (see 15A in FIG. 1), the sensor array 12 may be deployed such that the first piling location is disposed in the center of the sensor array 12. The sensors 10 in the sensor array 12 in FIG. 2 may in the present example embodiment have equal linear spacing between adjacent sensors 10.

The seismic energy source S may be a pile driver, such as a down the hole hammer and pile such as are described in U.S. Patent Application Publication No. 2022/0349256 A1 filed by Purcell et al. In one example embodiment, a control valve in the foregoing down the hole hammer and pile may be substituted by a solenoid operated valve, whereby under electronic control, the hammer may be operated to generate a particularly timed sequence of hammer blows when penetrating the pile. Such timed sequence may be as explained in, Choon Byong Park, Richard D. Miller, Don W. Steeples, and Ross A. Black, *Swept impact seismic technique (SIST)*, Geophysics, Vol. 61, No. 6 (November-December 1996); p. 1789-1803. In the foregoing technique, a pile driver, acting as an impact (impulse) seismic source, may be operated in a manner intended to transmit a few to several hundred high frequency, broad-band seismic impact pulses during several seconds of recording time according to a deterministic coding scheme. The deterministic coding scheme may consist of a time encoded impact sequence in which the rate of impact (impacts per second) changes substantially linearly with respect to time. When so operated, the down the hole hammer can provide a broad range of impact rates. Impact times used during the decoding process may be indexed or recorded on one channel of the recording unit 20. Impact depth may be precisely determined because the depth of the hammer is well defined. Signals detected by the sensors 10 may be communicated to the recording unit 20 for recording and subsequent signal processing to be further explained below. In addition to the time with respect to each hammer impact, the seismic signal recordings may be indexed to the hammer depth at each moment in time, that is, the hammer depth at the time of each signal recording may be identified with the hammer depth at each such time.

In one example embodiment, the down the hole hammer and pile may be arranged and used substantially as described in the '256 publication, wherein the control valve is entirely mechanical and is self-operating to cause the hammer to repeatedly impact the pile. In such embodiments, the flow rate and/or the pressure of fluid used to operate the hammer may be varied in order to control the rate at which the hammer strikes the pile. The flow rate and/or pressure may be varied, for example, linearly in order to obtain swept impact operation of the hammer as explained above. In such embodiments, changes in flow rate and/or pressure may affect the impact force exerted by the hammer, and as a result the amplitude of the seismic energy imparted into the water bottom sediments (11 in FIG. 1). In such case a pilot sensor 42, such as an accelerometer or strain gauge, may be used to make measurements corresponding to the impact force amplitude. Such pilot sensor measurements may be used to normalize amplitude of signal recordings made by the sensors (10 in FIGS. 2 and 3).

In some embodiments, the hydraulic water-powered down-the-hole pile hammer drill disclosed in the '256 publication may be modified to generate controllable, swept frequency impact seismic pulses imparted into the water bottom sediments 11. In some embodiments, the self-operating control valve in the disclosed down the hole hammer may be substituted by an electrical solenoid operated valve. Reciprocation of the drive mechanism for the down the hole hammer would thus be controlled by operation of the solenoid valve. Circuitry, e.g., a controller may be provided, either in the down the hole hammer itself or remotely, to operate the solenoid valve according to any preprogrammed or real time operating sequence. By controlling the hammer's reciprocation, a sequence of hammer impacts according to any predetermined scheme can be generated. Such schemes may include without limitation swept impact seismic as explained above to form seismic broadband signals used in a method according to the present disclosure. The above described controller may store a copy of the control signal for cross-correlation with the seismic sensors' output to obtain impulse response of the water bottom sediments to seismic energy.

As the pile (see 30 in FIG. 4) is driven into the water bottom sediments 11, the depth of the hammer (and thus the depth at which acoustic energy is imparted into the water bottom sediments) may also be recorded. Seismic signal recordings may be made from time to time using the sensor array (12 in FIG. 2, 14 in FIG. 3) as the hammer drives the pile into the water bottom sediments.

Figure 3:
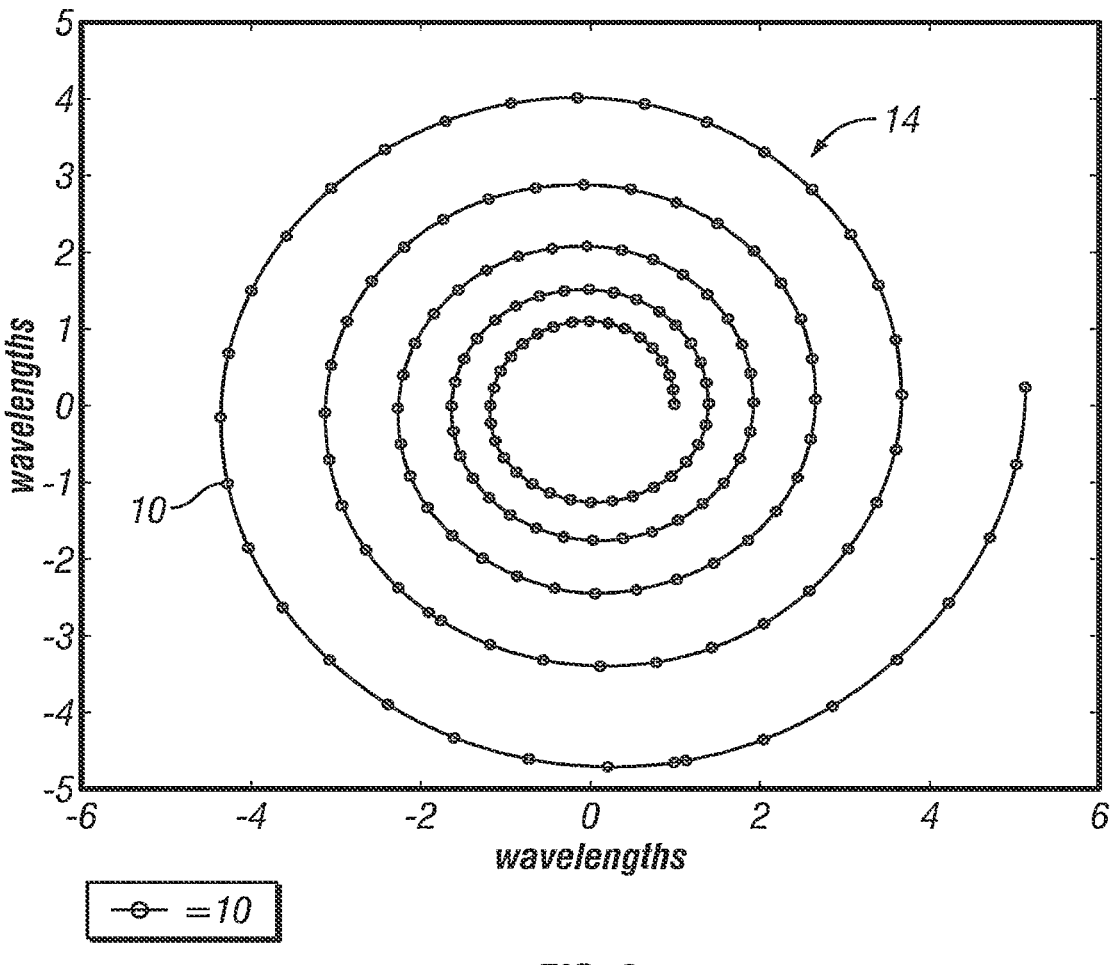
FIG. 3 shows another example embodiment of a spiral sensor array used in the initial part of a method according to the present disclosure.

During or after such signal recording while penetrating the first pile, the recorded signals may be processed to obtain a spatial distribution of acoustic properties of the water bottom sediments in the immediate vicinity of the first pile (at first location 15A in FIG. 1) and the sensor array (12 in FIG. 2 or 14 in FIG. 3).

The recorded signals may be processed to include beam steering. Generally, beam steering may be performed within the recording unit 20 by adding a selected time delay to the recording corresponding to each seismic sensor 10. The time delay is selected for each sensor 10 such that response of the array may be amplified along a selected direction and attenuated along any other direction. Because the hammer S is operated as the piling is driven into the sub bottom, seismic signal recordings may be made that correspond to precisely known depths of the source S in the subsurface, and direction and distance to each sensor 10 in the array 12.

In another example seismic sensor array, shown at 14 in FIG. 3, the sensors 10 may be spaced along the spiral such that the angle subtended between adjacent sensors 10 with reference to the center of the spiral is substantially equal. The recording system and seismic source are omitted from FIG. 3 only for clarity of the illustration; in use the pile driver (down the hole hammer) and recording unit would be used substantially as explained with reference to FIG. 2

In some embodiments, the geometry of the sensor array may be defined to obtain particular response characteristics. In order to define the geometry of the spiral in the array (12 in FIG. 2, 14 in FIG. 3) it is helpful to determine or define a desired overall array diameter, the total number of seismic sensors in the array and the spacing between individual seismic sensors. From the foregoing information the value of a parameter a is derived. The parameter a is related to the diameter of the array, D, measured in wavelengths of the seismic energy to be detected, and the spacing between the seismic sensors, d, also measured in wavelengths of the seismic energy to be detected. "Spacing" as that term is used with reference to the spiral is measured in a direction along the spiral curve. In examples having equal linear spacing between adjacent sensors the spacing may be referred to by the parameter d. In examples of a spiral having equal angular spacing between adjacent sensors, the spacing is that which results from using the same total length of spiral, the same number of sensors, and distributing the sensors angularly equally throughout the total angular extent of the sensor line used to generate the spiral.

The overall diameter D of the spiral may be in the range of 80 to 120 wavelengths of the lowest frequency seismic energy imparted into the subsurface by the source (S in FIG. 1), and the spacing, d, between adjacent seismic sensors may be one half wavelength of the lowest frequency seismic energy imparted into the subsurface.

The length of a radius from the center of the spiral to any selected point on the spiral can be defined by the expression $R=\exp(a\phi_m)$. The parameter a is dimensionless and is determined, as will be explained below, by minimizing a relationship shown which connects the total length L of the spiral, the overall diameter D of the spiral and the radius $R_0$ from the spiral center to the first sensor location on the spiral. Such parameters are related to what is referred to as the "design frequency" of the array. The design frequency is the frequency to which the array will exhibit the greatest sensitivity to seismic energy.

The distance from the center of the spiral to the first sensor position on the spiral is determined by the expression $R_0=\exp(a\Phi)$, and as may be inferred from the previous statement, such distance may be selected based on the design frequency of the array. The spiral is specified by the following equation where the angle $\phi$ can extend to the amount required to extend the spiral to the desired diameter D for a given value of a:

$$r = \exp(a\phi)$$

$$x = r\cos(\phi) = \exp(a\phi)\cos(\phi)$$

$$y = r\sin(\phi) = \exp(a\phi)\sin(\phi)$$

7

8

The sensors (10 in FIG. 2), as explained above, can either be placed at equal angular separation along the spiral (FIG. 3) or at equal linear separations (FIG. 2) along the spiral. The latter is more practical in the sense that a line array of equally spaced sensors, which are available commercially for conventional seismic exploration, can be readily deployed into a spiral. The former may have the advantage of providing the functional equivalent of radial lines of sensors (albeit with non-equal radial spacing) as described in the '307 patent referenced above. The total length of an equal sensor spacing array may be determined by the number of sensors and their linear spacing between adjacent sensors by the expression:

$$L = md$$

In order to perform beam steering, it is necessary to determine the coordinates of each sensor in the array. The coordinates of each of the sensors when deployed in a spiral having equal linear separation between adjacent sensors can be determined as follows. The length of an arc of the spiral between angles $\phi_i$ and $\phi_i + \Delta\phi$ is equal to d where:

$$\int_{\phi_i}^{\phi_i + \Delta\phi} r d\phi = d$$

$$d = \frac{\exp(a(\phi_i + \Delta\phi_i)) - \exp(a\phi_i)}{a}$$

The angular separation between each of the sensors $\Delta\phi_i$ can be determined by the expression:

$$\Delta\phi_i = \frac{1}{a} \log_e(1 + ad \exp(-a\phi_i))$$

The angle at which each of the sensors is disposed is:

$\phi_i = \phi_{i-1} + \Delta\phi_i$ where i=(1, m) and $\phi_1 = \Phi$, which determines how far from the center of the array that the first sensor is disposed.

Let $R_0 = \exp(a\Phi)$ represent the distance the first sensor is from the center.

The total length of the line of sensors in the spiral is determined by the expression:

$$L = md = \frac{\exp(a\phi_m) - \exp(a\Phi)}{a}$$

The diameter of the spiral D is taken as the average of two orthogonal measures of the diameter:

$$D = (\exp(a\phi_m) + \exp(a(\phi_m + \pi/2)) + \exp(a(\phi_m + \pi)) + \exp(a(\phi_m + 3\pi/2)))/2$$

$$aL + R_0 = \exp(a\phi_m) = \frac{2D}{(1 + \exp(a\pi/2) + \exp(a\pi) + \exp(a3\pi/2))}$$

Given the specified values of L, $R_0$ and D, the value of a can be obtained by a minimization of the expression:

$$\left| \left( aL + R_0 - \frac{2D}{(1 + \exp(a\pi/2) + \exp(a\pi) + \exp(a3\pi/2))} \right) \right|$$

The physical size of the array remains as specified at F=1 where F is the ratio between the frequency at which the spacing of sensors along the spiral is a half wavelength of the frequency of operation (the frequency to which the array is most sensitive). A low frequency is indicated by F<1 and a high frequency is indicated by F>1. The beam patterns are the same regardless of the frequency provided that the spacing between seismic sensors is the same when measured in wavelengths of the seismic energy imparted into the subsurface. In the present example, the spacing between sensors is selected to be a half wavelength along the spiral at a particular frequency called the design frequency. If the seismic energy source emits energy at the design frequency, the ratio of the seismic energy frequency with respect to the design frequency is unity. If the seismic energy frequency changes, F changes, and the beam pattern changes. An important attribute of the spiral array is that any beam pattern changes with respect to F are small and are well known.

The signal recordings made by the sensors in the array (12 in FIG. 2 or 14 in FIG. 3) may be used to obtain initial estimates of acoustic properties of the water bottom sediments (11 in FIG. 1). Because the source is disposed at successively greater depths at substantially a single geodetic location, and the sensors (10 in FIG. 2 or 3) are distributed about such location, i.e., the first piling location (15A in FIG. 1), the signal recordings may be processed to obtain information as would ordinarily be provided in an inverse vertical seismic profile (VSP) survey. Such information may include a profile of seismic or acoustic velocity with respect to depth in the sub bottom. The velocity profile may be used as an initial estimate of velocity for processing to be further explained below with reference to FIG. 5.

Figure 4:
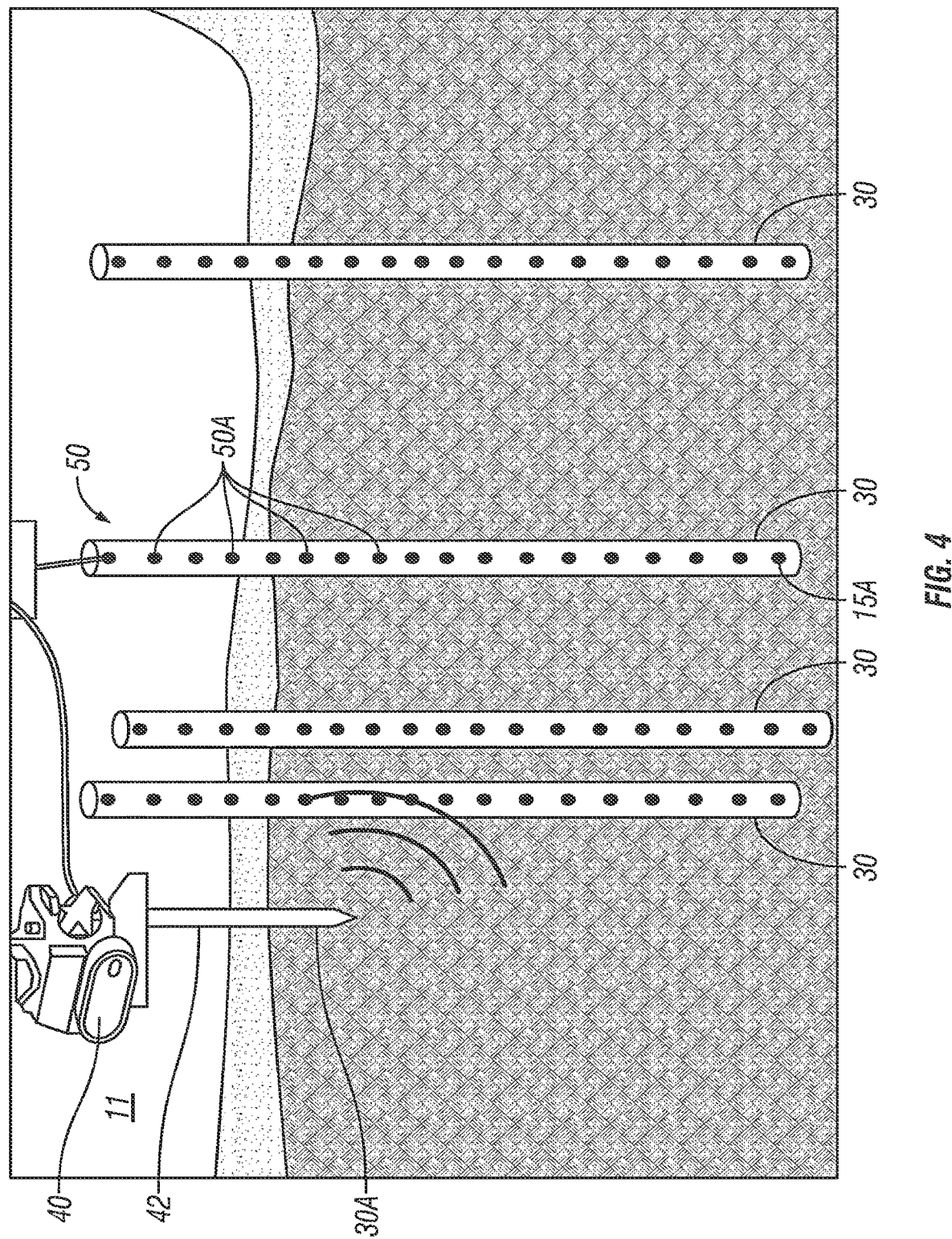
FIG. 4 shows operation of a pile driver and a distributed acoustic sensor.

Once signal recording proximate the first piling location, a method according to the present disclosure continues as follows. FIG. 4 shows a schematic drawing of the circumstances after the piling, shown at 30, is driven fully into the water bottom sediments 11 at the first piling location 15A. A distributed acoustic sensor 50 such as an optical fiber with a plurality of spaced apart, individual-frequency Bragg gratings, may be disposed in the hole generated by penetrating the piling 30 into the sediments 11 at the first location 15A. Then cement or grout may be set to make the piling and distributed acoustic sensor 50 into a permanent installation. The distributed acoustic sensor 50 may be placed in signal communication (e.g., by wire, optical fiber or wirelessly) with the recording unit (20 in FIG. 2) for subsequent recording of acoustic signals generated by the pile driver 40, when it is moved to a subsequent piling location 15 and a subsequent pilling 30A is driven into the water bottom sediments 11. The acoustic sensing typically relies on the specially doped fiber-optic cable individually cemented along the emplaced piles. Many sensing elements 50A can be synthesized in a single fiber with a typical longitudinal spacing between sensing elements 50A of less than 10 cm. During operation of the pile driver 40, when the hammer is at specific, known depths in the sub-bottom, signal recordings may be made of signals detected by the distributed acoustic sensor 50. Thus, a plurality of acoustic signals are detected and recorded, each such signal representing seismic or acoustic response along a unique, well defined (because source and sensor depths are well known) acoustic travel path from the bottom of the pile 30A at the subsequent pile location 15 (as a result of hammer/pile impact), and the location of each sensing element 50A (e.g., one of the Bragg gratings on a fiber DAS) on the distributed acoustic sensor 50. The spatial location of each sensing element 50A may be determined from the known trajectory of the hole created by penetrating the respective pile (e.g., 30A), which may be vertical. Vertical trajectory of such pile hole is not a limit on the scope of the present disclosure; it is only required to know the trajectory in order to determine each sensing element's spatial location in the sediments 11.

In some embodiments, a further spiral array of sensors as described with reference to FIG. 2 or FIG. 3 may be deployed on the water bottom 11 about the subsequent pile location 15 and any further pile locations (see FIG. 1) for signal detection and recording, however such deployment and signal recording are not necessary to perform a method according to the present disclosure. It is sufficient to detect and record signals from the distributed acoustic sensor(s) 50 and to use such signal recordings in generating updated spatial distributions of properties of the sub bottom sediments as will be further explained.

In continuing a method according to the present disclosure, as the pile penetrating on the subsequent location 15 is completed, a second distributed acoustic sensor (not shown in FIG. 4) may be inserted into the piling hole prior to cementing or grouting, just as for the initial piling location 15A. The pile driver 40 may then be moved to any further location (see 15 in FIG. 1) not yet having a driven piling therein. Acoustic signals generated by the pile driver 40 may be detected at the distributed acoustic sensor 50 in both the first location 15A and in each subsequent location 15 having a fully driven piling and distributed acoustic sensor 50 inserted therein. The foregoing process may be repeated until all the piling locations have fully driven pilings therein.

In this manner, a set of acoustic signal recordings corresponding to a plurality of precisely known source locations and source depths, and precisely known sensor locations and sensor depths may be used to generate a high resolution image of spatial distribution of acoustic properties of the water bottom sediments 11. Such properties may include, without limitation, physical particle to particle composition of the sediments, presence and type of fluid in the pore spaces as well as the porosity/density of the sediments, any structural discontinuities of the various compositions of sediment in the sub bottom and the presence of any geopressure hazards in the sub bottom.

In some embodiments, the signals detected by each sensing element 50A in each DAS 50 may be beam-steered to enhance detected diffractor signal responses from each piling location 15 and at each source depth in each such piling location 15. Beam steering may be performed, advantageously, using signals detected by each sensing element 50A at each piling location 50, particularly when the last piling is being driven, such that all remaining piling locations 15 have installed therein a DAS 50. Beam steering may comprise applying suitable time delays to the signals detected by each corresponding sensing element 50A in each DAS 50 at the same specific depth in order to cause the sensing element response to correspond to each point in a defined pattern, e.g., a grid of points defined within the area enclosed by the piling locations 15. Such beam steering may be repeated at each sensing element depth over the entire length of the pilings (and corresponding DASs). The points on such grid or other defined pattern may be referred to for convenience as "focal points."

The following outlines an example embodiment of a data processing sequence as applied to the signals detected by the spiral array (FIG. 2 or FIG. 3) and the DAS 50 at one or more of the piling locations (15 in FIG. 1). In addition to such signals, other data, such as positional data of the source(s) and/or the sensors(s), wellbore (piling hole) trajectory, or any other ancillary data, may be collected and may be co-rendered/augmented with the primary (seismic signal) data. An example embodiment of a data processing sequence may comprise the following:

1. Quality control and rectifying ancillary data;
2. Quality control and rectifying primary data;
3. Co-rendering/combining primary and ancillary data;
4. Quality control and rectifying the combined data (referred to as preprocessed data for convenience) from step 3 above;
5. Suppressing and/or removing spurious events from the combined data, such as noise bursts, guided waves, multiple-reflected waves, ground roll, direct arrivals, and any other recorded signals not relevant to imaging;
6. Establishing an image volume in the water bottom sediments (11 in FIG. 1), which may be defined as a 2- or 3-dimensional regular lattice with each lattice node representing a center of a 2- or 3-dimensional lattice cell. In the present example embodiment, the image volume may be defined by the geodetic positions and longitudinal extent (depth) of the pilings (see FIG. 1 and FIG. 4);
7. If specular reflectors are present in the preprocessed data (i.e., the combined data prior to image processing) then,
   a Establishing an initial compressional and/or shear wave velocity model (spatial distribution of compressional and/or shear wave velocity) in the volume; if anisotropic velocity phenomena are observed, then initializing associated anisotropic velocity model(s) in the volume,
   b. Performing parameter analysis (e.g., velocity analysis) to populate the initial model(s) with best-fit seismic wavefront travel-time approximation values (e.g., using semblance analysis) for each of a plurality of selected points (e.g., focal points) in the volume for each seismic sensor position,
   c. Imaging using conventional seismic migration methods to obtain undifferentiated specular and non-specular representations of the volume (e.g., prestack Kirchhoff time and/or depth migration) using models as explained above,
   d. Extracting and mapping specular image boundaries (as 2 dimensional surfaces, for example, seismic horizons), and using the mapped specular image boundaries thus determined to form a model of the specular component of the subsurface volume being imaged,
   e. Using a Guigné-Gogacz Beamformer function as explained below with reference to Eq. (1), imaging and/or deriving attributes associated with specular and non-specular events as separate and differentiated data sets. The Guigné-Gogacz Beamformer function may be substantially as described in U.S. Pat. No. 11,360,266 issued to Guigné; Jacques Y. et al. and incorporated herein by reference,
8. If no specular events are present in the preprocessed data then,
   a. Establishing an initial compressional and/or shear wave velocity model; if anisotropic phenomena are observed, then initializing associated velocity model(s),
   b. Performing parameter analysis (e.g. velocity analysis via diffraction focusing) to populate initial the model(s)

with best-fit seismic wavefront travel-time approximation values (e.g. semblance analysis) for each of a plurality of selected points in the volume to each seismic sensor position, c. Using Guigné-Gogacz Beamformer, as explained below with reference to Eq. (1), obtaining non-specular image representations of the subsurface volume being imaged, d. Analyzing the sub bottom volume and derived attribute data sets and mining the data sets for relevant information. For example, particle to particle structure, large particle composition such as boulders and cobbles and/or fluid content of formations identified as diffractors may be determined using the foregoing method.

Beamforming in the process described above may be performed according to the following expression, referred to as the "Guigné-Gogacz Beamformer" for convenience:

$$I(x_0, x_1, x_2) = \sum_{(s,r) \in \Omega} \Psi(s, r, t) \otimes_0 \qquad (1)$$

$$\left( \sum_{i \in \Gamma(s,r,x_0,x_1,x_2)} w_i(s, r, x_0, x_1, x_2) \delta(t + \phi_i(s, r, x_0, x_1, x_2)) \right)$$

wherein:

$\Gamma(s, r, x_0, x_1, x_2)$ represents the space all ray-paths connecting source location s to image point $I(x_0, x_1, x_2)$ (e.g., focal point) to sensor locations r;

$I(x_0, x_1, x_2)$ represents the output (e.g., scattering intensity, reflectivity, attenuation) at $(x_0, x_1, x_2)$ location, where the output depends on input data type and is not a proxy for a property under assessment;

$\Omega$ represents the collection of all source-sensor pairs;

$\Psi(s, r, t)$ represents a trace, that is, time indexed recorded signals detected by a sensor (e.g., sensing element 50A) at location r, due to source (driven piling 30) at location s, with t representing that senor's event detection time. A trace may be extended to infinity by padding with zeros before and after the detection time;

$\delta$ represents Dirac distribution (continuous-time signal representation) or Kronecker delta (discrete-time signal representation);

$\otimes_0$ represents 1-dimensional convolution evaluated at 0 (zero);

$\phi_i(s, r, x_0, x_1, x_2)$ represents the function which returns travel time from source location s to image point $I(x_0, x_1, x_2)$ to sensor location r along a specific ray-path;

$w_i(s, r, x_0, x_1, x_2)$ represents a weight function which embodies, amplitude transmission loss due signal travel from source to image point to receiver, normalization correction due to variable summation count, and specularity or non-specularity condition (pass-reject) based on desired output and subject to equations as in previous slide.

Eq. (1) enables association of selected (specular or non-specular stream) amplitudes of events in seismic energy as detected by the seismic sensors (at the individual sensing elements 50A in FIG. 4 or the sensors on the arrays as in FIG. 2 or FIG. 3) with specific locations in the sub bottom. In specular mode, not all the seismic sensors detect signals associated with a specific location in the subsurface; only those sensor-source pairs that satisfy the specularity condition are selected to contribute. For non-specular (e.g., diffractor) imaging, the non-specular condition is applied to obtain a corresponding result.

Figure 5:
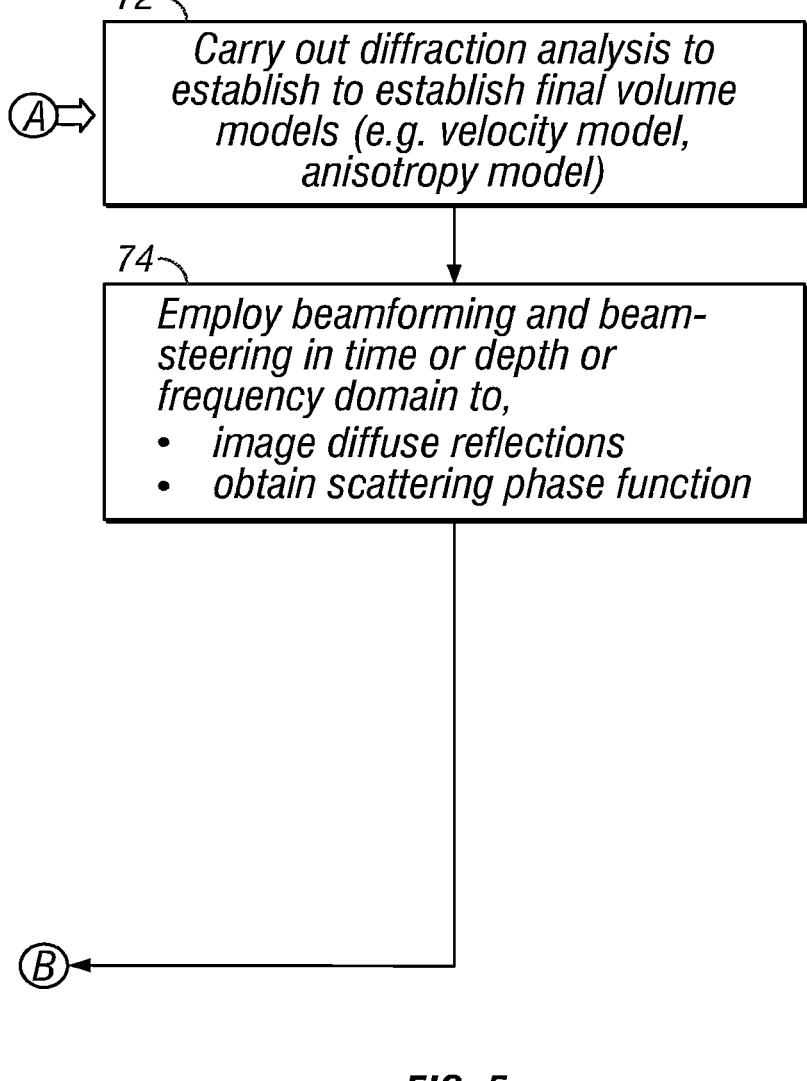
FIG. 5 shows a flow chart of an example signal processing method according to the present disclosure.

The foregoing example embodiment of a method is shown in a flow chart in FIG. 5. At 61, the seismic signals detected by the DAS and the spiral array as may be the case, and as may be recorded in the recording unit (20 in FIG. 2) can be processed using conventional seismic imaging techniques to determine if specular events are present in the detected (and recorded as may be the case) signals. If specular events are present in the detected signals, then at 60, conventional specular reflection seismic imaging such as Kirchhoff prestack time migration and/or depth migration may be used to image such specular events. At 62, the specular events may be extracted from a composite image (containing both specular and non-specular events) generated using the detected seismic signals. The composite image may be generated using, for example, conventional seismic signal processing such as Kirchhoff prestack time migration. At 64, one or more seismic horizons (e.g., continuous specular reflection events) may be smoothed using a 2-dimensional filter such as a median filter. The output of smoothing, if used, is a set of points in space that represent the horizon. At 66, (unit) normal vectors at each point of the horizon (node, defined as explained above as a 2- or 3-dimensional regular lattice with each lattice node representing a center of a 2- or 3-dimensional lattice cell) in the subsurface volume may be computed from, e.g., i) locally least-squares fitting a low-order 2-dimensional polynomial to the determined horizon at each node, ii) defining the normal vectors for the node using an analytic expression from partial derivatives of the local polynomial obtained in the previous step, and iii) interpolating/extrapolating the normal vector to each other node within the subsurface volume. The horizon (a specular 2 dimensional surface for 3 dimensional data or a curve for 2 dimensional data) is represented by a discrete set of points. Fitting of a local polynomial to the surface/curve at each node allows obtaining a local analytic representation of the horizon and thus allows computing normals to the horizon.

Using the recorded sensor signals acquired as explained above, the normal vectors determined as explained above, and a model of spatial distribution of seismic velocity (e.g., as may be determined from imaging at 60, 62), then at 68, the beamforming explained above with reference to Eq. (1) may be used to determine specular-event and non-specular-event (diffractor) seismic data sets. At 76, post processing may be used to determine, from the specular and non-specular seismic data sets, certain properties of the water bottom sediments (e.g., 11 in FIG. 1), for example, amplitude vs. offset (AVO), amplitude vs. angle (AVA) and/or azimuthal variation in amplitude vs. offset (AVAz), or any other amplitude or travel-time dependent methods known in the art, where such processes are performed on the specular events identified in the composite image.

If there are no specular events in the recorded signals, then at 72 in FIG. 5, diffraction-focusing analysis may be performed to establish volume models (e.g., velocity model, anisotropy model), where these models along with preprocessed sensor data comprise inputs to the Guigné-Gogacz Beamformer defined with reference to Eq. (1). At 74, beamforming and beam-steering (explained above) may be performed in the time, depth or frequency domain to, image diffuse reflections and obtain scattering phase functions. At 76, post processing as in the case of specular events may be performed.

In some embodiments, properties of the formations determined as explained with reference to 76 in FIG. 2, may be additionally calibrated using data from physical samples of rock formations penetrated by a well drilled through the water bottom sediments. Properties so calibrated may include, for example and without limitation, porosity, pore fluid pressure, sediment compressive strength, sediment elastic modulus and sediment Young's modulus. The disclosed method specifically is designed to enable a correspondence between seismic signal parameters and these sediment properties. Using the determined correspondence, it may be possible to determine acoustic properties of the water bottom sediments using values of seismic parameters as explain above mapped to positions in the sub bottom volume bounded by the driven pilings (see FIG. 1 and FIG. 4). The exactitude in the sensing element positions, their respective measurements and the precision in separating the contributions from the specular responses by isolating the non-specular (e.g., diffractor) responses in the detected signals means that the acoustic transmission losses captured in the separated signals can be as attributed to attenuation from absorption and not from backscatter. After the depth of the sensing elements (50A in FIG. 4) and the direction of the source (pile driver 40) are defined, and first breaks (first events in seismic amplitude exceeding a selected threshold) have been picked using integrated P and S waves simultaneously in the analysis; the interval velocity, average velocity, and Poisson's ratio may be calculated for each focal point.

In the method according to the present disclosure, the acoustic source (pile driver 40) and the sensors (50 in FIG. 4) attached to the piles (30 in FIG. 4) provide focal points to be established by beam steering the sensor responses. The Xf, Yf, and Zf coordinates of each desired focal point and the Xr, Yr, and Zr coordinates of all the sensing elements 50A are specified.

A particular focal point containing a significant discontinuity can be selected by inspecting the resultant focal point strengths map. Knowing the coordinates, the signal's timings at each sensor (sensing element 50A) can be extracted from the data. This would be done as amplitude over a time window determined by the bandwidth.

The output signal from this particular receiver (i) is:

$$Sp(i) = 10^{(S_i/20)} = \frac{sl * ts}{R_0 R_i} \exp\left(-\frac{\alpha(R_0 + R_i)}{8.7}\right) \mu Pa \qquad (2)$$

The output for a separate receiver, j, is $$Sp(i) = 10^{(S_j/20)} = \frac{sl * ts}{R_0 R_j} \exp\left(-\frac{\alpha(R_0 + R_j)}{8.7}\right) \mu Pa \qquad (3)$$

where sl and ts are SL and TS expressed in linear terms and $\alpha/8.7$ is the attenuation in Nepers per m with $\alpha$ in dB per m.

The ratio of these outputs allows the attenuation to be estimated by the following expression:

$$\alpha_{est} = \frac{8.7}{R_i - R_j} \log_e\left(\frac{R_j}{R_i} \frac{Sp(j)}{Sp(i)}\right) \qquad (4)$$

Attenuation thus estimated is that of the two paths from the focal point to the two sensing elements at the center frequency of the source (pile driver 40). If two sensing elements are selected that are close together, the acoustic energy path along which the attenuation is estimated is reasonably well-defined. An inversion procedure may be performed to estimate the attenuation with respect to depth by choosing many pairs of closely spaced sensing elements (50A in FIG. 4). Further, by selecting focal points distributed throughout the sub bottom volume, the distribution of acoustic energy paths over which the attenuation is estimated provides the spatial variation in attenuation. The particular focal point selected could be the location of the acoustic source (pile driver 40) itself. While such focal point selection might provide more significant signals, it would also give attenuation estimates based on longer energy travel paths.

Having the acoustic signal data thus processed throughout focal points in the sub bottom volume (i.e., in the water bottom sediments) provides detailed velocity profiles, depth-converted stratigraphic boundaries, and delineation and quantification of spatial distribution of acoustic properties of the water bottom sediments. The method according to the present disclosure may be used to convert the acoustic attenuation so determined to properties of density, and with the acoustic velocities and attenuations values, a Dynamic Elastic Modulus can be delivered. D. R. Jackson and M. D. Richardson, *High-Frequency Seafloor Acoustics*, D R Jackson provides comparison tables and discloses certain empirical relationships between attenuation and mean grain size, porosity and density. Moreover, it is possible using such determined values, to calculate dynamic shear modulus, dynamic constrained modulus, dynamic bulk modulus and dynamic Young's modulus. The foregoing moduli may be plotted, e.g., with respect to depth in a variable density plot in the X-Y plane. Referring to FIG. 6, an example plot at a single depth of small strain is shown in the upper part of the figure, and calculations for the described other moduli are shown in the lower part of the figure. Any or all of the described moduli and associated strains may be plotted in a variable density plot (wherein the gray scale darkness corresponds to the value at each point in the images) for any one or more selected depths.

Figure 7:
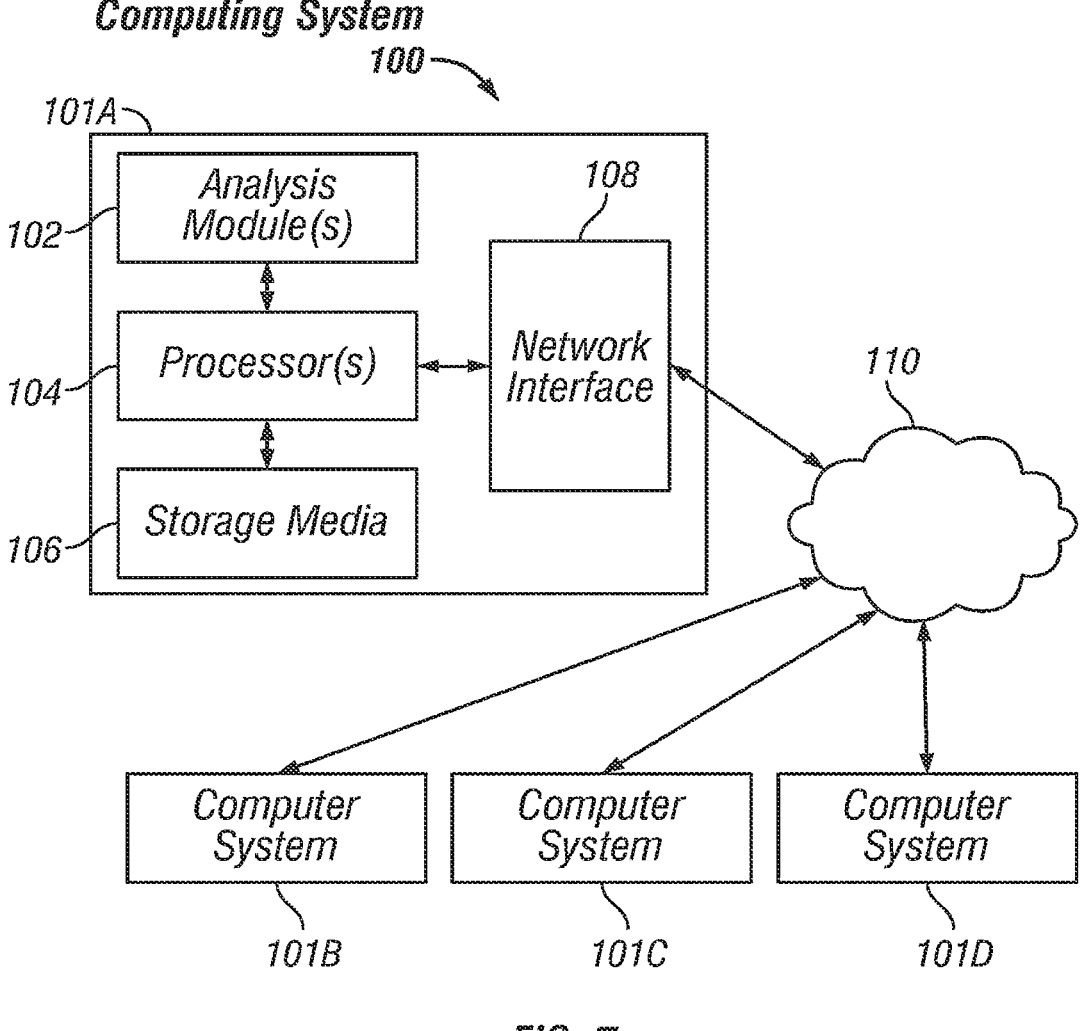
FIG. 7 shows an example computer system that may be used in some embodiments.

The foregoing process may be performed on a computer or computer system, an example of which is shown at 100 in FIG. 7. The computing system 100 may be an individual computer system 101A or an arrangement of distributed computer systems. The individual computer system 101A may include one or more analysis modules 102 that may be configured to perform various tasks according to some embodiments, such as the tasks explained with reference to FIGS. 1 through 6. To perform these various tasks, the analysis module 102 may operate independently or in coordination with one or more processors 104, which may be connected to one or more storage media 106. A display device 105 such as a graphic user interface of any known type may be in signal communication with the processor 104 to enable user entry of commands and/or data and to display results of execution of a set of instructions according to the present disclosure.

The processor(s) 104 may also be connected to a network interface 108 to allow the individual computer system 101A to communicate over a data network 110 with one or more additional individual computer systems and/or computing systems, such as 101B, 101C, and/or 101D (note that computer systems 101B, 101C and/or 101D may or may not share the same architecture as computer system 101A, and may be located in different physical locations, for example, computer systems 101A and 101B may be at a well drilling location, while in communication with one or more computer systems such as 101C and/or 101D that may be located in one or more data centers on shore, aboard ships, and/or located in varying countries on different continents).

A processor may include, without limitation, a microprocessor, microcontroller, processor module or subsystem, programmable integrated circuit, programmable gate array, or another control or computing device.

The storage media 106 may be implemented as one or more computer-readable or machine-readable storage media. Note that while in the example embodiment of FIG. 7 the storage media 106 are shown as being disposed within the individual computer system 101A, in some embodiments, the storage media 106 may be distributed within and/or across multiple internal and/or external enclosures of the individual computing system 101A and/or additional computing systems, e.g., 101B, 101C, 101D. Storage media 106 may include, without limitation, one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that computer instructions to cause any individual computer system or a computing system to perform the tasks described above may be provided on one computer-readable or machine-readable storage medium, or may be provided on multiple computer-readable or machine-readable storage media distributed in a multiple component computing system having one or more nodes. Such computer-readable or machine-readable storage medium or media may be considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

It should be appreciated that computing system 100 is only one example of a computing system, and that any other embodiment of a computing system may have more or fewer components than shown, may combine additional components not shown in the example embodiment of FIG. 7, and/or the computing system 100 may have a different configuration or arrangement of the components shown in FIG. 7. The various components shown in FIG. 7 may be implemented in hardware, software, or a combination of both hardware and software, including one or more signal processing and/or application specific integrated circuits.

Further, the acts of the processing methods described above may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of the present disclosure.

In conclusion, the precision of controllable-timing swept impacts and well known depths of the pile driver being used as a seismic source, combined with the pile-based sensor array characteristics and unique signal treatments using beamforming and beam steering to capture the backscatter response, leads to exact (error less than 1%) correlation algorithms, makes the delivery of very high density signal detection translated into a correlated set of geotechnical properties possible. The result or outcome yields processed data images with finer resolution cells and correlations to sedimentary physics. Using a programmable hammer (pile driver) to generate the seismic signals used in the novel collective pile sensor configuration may deliver usable determination of small strain modulus values.

Beamforming through the sub bottom volume fully exploits the reflected (specular) and scattered (non-specular) wavefields. While similar to seismic migration, the very fine scale being applied is not known in the art prior to the present disclosure, methods according to which may deliver an acoustic texture response that defines geotechnical values producing higher-order formation heterogeneity and geohazard maps in soil strength identification.

Data processing according to the present disclosure quantifies and differentiates sedimentary textural responses through the sub bottom volume and directly around a foundation installation. Over time, the method may be used to monitor changes in sediment properties over the structure's life.

A highly sensitive delineation of differences inside the foundation installation is attained as exact locations. The changes are known through the sub bottom volume. These differences represent subtle variances in the geotechnical properties. These reproducible subtle differences constitute an answer product obtainable by the disclosed method. Therefore, absolute values of soil properties are not required.

The area of changes in the sub bottom volume may be inputted into a foundation risk stability analysis. Varying differences and locations within the sub bottom volume may provide foundation strength changes over the life of the foundation, indicating sediment parameter changes and potential foundation weaknesses. Actions can be taken to reinforce the foundation by adding piles in response to the Invention's monitoring of soil differences in particular by being guided by the changes through the imaged volume of the small strain shear modulus.

In light of the principles and example embodiments described and illustrated herein, it will be recognized that the example embodiments can be modified in arrangement and detail without departing from such principles. The foregoing discussion has focused on specific embodiments, but other configurations are also contemplated. In particular, even though expressions such as in "an embodiment," or the like are used herein, these phrases are meant to generally reference embodiment possibilities, and are not intended to limit the disclosure to particular embodiment configurations. As used herein, these terms may reference the same or different embodiments that are combinable into other embodiments. As a rule, any embodiment referenced herein is freely combinable with any one or more of the other embodiments referenced herein, and any number of features of different embodiments are combinable with one another, unless indicated otherwise. Although only a few examples have been described in detail above, those skilled in the art will readily appreciate that many modifications are possible within the scope of the described examples. Accordingly, all such modifications are intended to be included within the scope of this disclosure as defined in the following claims.

What is claimed is:

1. A method for mapping acoustic properties of water bottom sediments, comprising:
   penetrating a first piling into the water bottom sediments at a first location of a plurality of locations associated with a structural foundation;

inserting a first distributed acoustic sensor adjacent to the first penetrated piling;

penetrating a second piling into the water bottom sediments at a second location of the plurality of locations;

detecting acoustic signals at the first distributed acoustic sensor while penetrating the second piling, the detecting acoustic signals indexed to a depth of the second penetrated piling as the second piling is driven;

inserting a second distributed acoustic sensor adjacent to the second driven piling;

repeating at each remaining one of the plurality of locations, penetrating a piling, detecting acoustic signals at each of the inserted distributed acoustic sensors and inserting a distributed acoustic sensor adjacent each penetrated piling; and using the detected acoustic signals to generate a map of acoustic properties of the water bottom sediments in a volume bounded by the plurality of locations, the acoustic properties comprising at least attenuation excluding effects of acoustic diffractors in the water bottom sediments.

2. The method of claim 1 further comprising deploying a spiral array of acoustic sensors on a water bottom around the first location, and detecting acoustic signals corresponding to impacts of penetrating the first piling at the acoustic sensors on the spiral array, wherein the generating the map comprises determining an acoustic velocity profile proximate the first location from the detected acoustic signals from the spiral array.

3. The method of claim 2 wherein the spiral array comprises sensors spaced apart at equal angles.

4. The method of claim 2 wherein the spiral array comprises sensors spaced apart at equal distances between adjacent sensors.

5. The method of claim 1 wherein each distributed acoustic sensor comprises a plurality of individual optical sensing elements along an optical fiber.

6. The method of claim 1 wherein penetrating the first piling, penetrating the second piling and penetrating any subsequent piling comprises operating a hammer using a swept impact timing sequence.

7. The method of claim 1 wherein the generating the map comprises beam steering a response of individual sensing elements on each distributed acoustic sensor to each of a plurality of points in the volume.

8. The method of claim 1 wherein the excluding effects of diffractors comprises beamforming a response of the distributed acoustic sensors.

9. The method of claim 1 further comprising generating a map of at least one of density, porosity and fluid pressure of the water bottom sediments from the map of acoustic properties.

10. The method of claim 1 further comprising measuring signals on each of the first piling and subsequently driven pilings during penetrating thereof, and using the measured seismic signals on each of the pilings while penetrating to correct the detected acoustic signals for timing and/or amplitude variation.

11. The method of claim 10 wherein correcting the detected acoustic signals comprises cross-correlating the detected acoustic signals with the measured seismic signals.

12. The method of claim 1 further comprising generating an image of distribution of strain at at least one depth in the water bottom sediments.

13. A computer program stored in a non-transitory computer readable medium, the computer program comprising logic operable to cause a programmable computer to perform actions on acoustic signals detected by a plurality of sensing elements on each of a plurality of distributed acoustic sensors, each distributed acoustic sensor placed proximate a piling penetrating into water bottom sediments to support a structure, the acoustic signals acquired in response to penetrating a subsequent piling into the water bottom sediments, the actions comprising:

indexing the detected acoustic signals with respect to depth of the penetrating piling and a time of detection; and using the indexed, detected acoustic signals to generate a map of acoustic properties of the water bottom sediments in a volume bounded by the plurality of driven pilings, the acoustic properties comprising at least attenuation excluding effects of acoustic diffractors in the water bottom sediments.

14. The computer program of claim 13 further comprising logic operable to cause the programmable computer to generate an acoustic velocity profile proximate a position of the penetrating piling from signals detected by a spiral array of acoustic sensors deployed on a water bottom proximate the penetrating piling.

15. The computer program of claim 14 wherein the spiral array comprises sensors spaced apart at equal angles.

16. The computer program of claim 14 wherein the spiral array comprises sensors spaced apart at equal distances between adjacent sensors.

17. The computer program of claim 13 wherein each distributed acoustic sensor comprises a plurality of individual optical sensing elements along an optical fiber.

18. The computer program of claim 13 wherein penetrating the piling comprises operating a hammer using a swept impact timing sequence.

19. The computer program of claim 13 wherein the generating the map comprises beam steering a response of individual sensing elements on each distributed acoustic sensor to each of a plurality of points in the volume.

20. The computer program of claim 13 wherein the excluding effects of diffractors comprises beamforming a response of the distributed acoustic sensors.

21. The computer program of claim 13 wherein the acoustic properties comprise at least one of density, porosity and fluid pressure of the water bottom sediments from the map of acoustic properties.

22. The computer program of claim 13 further comprising logic operable to cause the programmable computer to perform using signals measured on the penetrating piling to correct the detected acoustic signals for timing and/or amplitude variation.

23. The computer program of claim 22 wherein correcting the detected acoustic signals comprises cross-correlating the detected acoustic signals with the measured seismic signals.

24. The computer program of claim 13 further comprising logic operable to cause the programmable computer to generate an image of distribution of strain at at least one depth in the water bottom sediments.

* * * * *